(12) United States Patent
Durrin

(10) Patent No.: US 6,196,572 B1
(45) Date of Patent: Mar. 6, 2001

(54) CONVERTIBLE JOGGING STROLLER AND TRAILER

(76) Inventor: Greg R. Durrin, 81 Terry La., Selah, WA (US) 98942

( * ) Notice: Subject to any disclaimer, the term of this patent is extended or adjusted under 35 U.S.C. 154(b) by 0 days.

(21) Appl. No.: 09/233,804

(22) Filed: Jan. 19, 1999

(51) Int. Cl.[7] .......................... B62D 61/06; B62K 27/00; B60R 7/12
(52) U.S. Cl. .......................... 280/648; 280/62; 280/656; 280/643; 280/204
(58) Field of Search ................................. 280/642, 643, 280/647, 648, 650, 656, 657, 658, DIG. 6, 204, 292, 62

(56) References Cited

U.S. PATENT DOCUMENTS

| 5,076,599 | * | 12/1991 | Lockett et al. | 280/204 |
|---|---|---|---|---|
| 5,123,670 | * | 6/1992 | Chen | 280/650 |
| 5,224,720 | * | 7/1993 | Chaw et al. | 280/62 |
| 5,299,825 | * | 4/1994 | Smith | 280/650 |
| 5,301,963 | * | 4/1994 | Chen | 280/204 |
| 5,318,318 | * | 6/1994 | Berner et al. | 280/204 |
| 5,421,597 | * | 6/1995 | Berner | 280/204 |
| 5,454,577 | * | 10/1995 | Bell | 280/204 |
| 5,468,009 | * | 11/1995 | Eyman et al. | 280/650 |
| 5,474,316 | * | 12/1995 | Britton | 280/204 |
| 5,522,614 | * | 6/1996 | Eyman et al. | 280/642 |
| 5,536,033 | * | 7/1996 | Hinkston | 280/642 |
| 5,593,174 | * | 1/1997 | Graziano et al. | 280/647 |
| 5,611,560 | * | 3/1997 | Thimmig | 280/642 |
| 5,695,212 | * | 12/1997 | Hinkston | 280/642 |
| 5,785,333 | * | 7/1998 | Hinkston et al. | 280/204 |
| 5,921,571 | * | 7/1999 | Bell | 280/204 |
| 6,017,051 | * | 1/2000 | Thimmig | 280/650 |

* cited by examiner

Primary Examiner—Lanna Mai
Assistant Examiner—Jeffrey Restifo
(74) Attorney, Agent, or Firm—Stratton Ballew PLLC

(57) ABSTRACT

A convertible trailer and stroller having, a pair of frame blocks mount to a frame member of a jogging stroller, each proximate the two rear wheels of the jogging stroller. The frame blocks are each attached to a wheel block at a wheel pivot that interconnect the frame blocks to their respective wheel blocks. A pair of wheels having hub axle ends are received into a wheel bearing within each of the wheel blocks, and the wheel blocks are rotatable about the respective block pivots to selectably raise or lower each wheel relative to the block pivots. In the lowered wheel, or stroller configuration, a high ground clearance for all terrain operation is provided, while in the raised wheel or trailer configuration, a low and stable center of gravity is provided. The convertible trailer and stroller can also include an upper bar that attaches to the wheel blocks. The upper bar converts from a handle bar position to a roll bar position as functions of the pivotable rotations of the wheel blocks about the frame blocks. The handle bar position provides a push or pull point in the stroller configuration, while the roll bar position operates in the trailer configuration to provide protection to a passenger in a tip over.

12 Claims, 15 Drawing Sheets

CONVERTIBLE JOGGING STROLLER AND TRAILER

TECHNICAL FIELD

The invention provides a jogging stroller that easily converts into a trailer. More particularly, a set of pivotable rear wheel assemblies and a movable upper bar are disclosed herein, for converting the jogging stroller into the trailer.

BACKGROUND OF THE INVENTION

Three-wheeled strollers have a significant advantage over their four wheeled predecessors in that a three-wheeled configuration is better suited to steer, negotiate bumps and comfortably carry a passenger. The three-wheeled stroller has two wheels positioned at the rear and a single wheel positioned in the front of the stroller, to form a stable tripod. The "jogging" variation of the three-wheeled stroller is simply a three-wheeled stroller designated as a jogging stroller to suggest that the person pushing the stroller can safely jog or run while pushing the stroller over varying terrain.

Several U.S. design and utility patents relate to improvements in three wheeled jogging strollers. U.S. Pat. No. 5,188,389 to Baechler discloses a three wheeled, collapsible or foldable baby stroller having a removable rear hub system. Baechler '389 teaches the removal of the rear hub to aid in collapsible storage and transport. U.S. Pat. No. 5,356,171 to Schmidlin describes another variation of the collapsible jogging stroller. Schmidlin '171 includes hinging frame components to allow the compact folding of the stroller.

These collapsible jogging strollers are easily transportable and convertible to a storage position. However, ease of transport is only one aspect of a well-designed stroller. Many users want a stroller that is collapsible, but can also perform more than a single function. A multifunction stroller provides the economy and convenience of a single stroller while performing various tasks or duties that typically would require separate strollers, each designed for a single, specific purpose.

Trailer strollers are another classification of strollers. Trailer strollers typically attach to the frame of a bicycle and allow a passenger to be towed by a rider of the bicycle. Though it has a function similar to that of jogging strollers, which is the safe carrying of a passenger, the trailer stroller has a significantly different appearance. Typically, the trailer stroller includes only two rear wheels, with an attachment to the bicycle frame as a forward support, which is located in the same position as the front wheel of the jogging stroller.

A significant problem with the conversion between the jogging stroller and the trailer stroller is that two opposing functional characteristics are required for each use. Specifically, the jogging stroller must have a high ground clearance for all terrain operation, for such problems as negotiating street curbs and irregular road or trail surfaces. In contrast, the trailer stroller does not require a curb jumping clearance; and instead it requires a low and stable center of gravity. Tipping a bicycle towed trailer stroller can be disastrous to both the bicycle rider and the stroller's passenger. To function well as both a jogging stroller and a trailer stroller, a convertible jogging stroller and must have the ability to adapt to these opposing use requirements.

For example, U.S. Pat. No. 5,344,171 to Garforth-Bles describes a three-wheeled stroller that is convertible to a trailer. Garforth-Bles '171 includes a wheel fork assembly that can be disassembled and flipped between the configurations shown in FIG. 14 and FIG. 15, therein. This "re-configuration" of the Garforth-Bles '171 stroller converts the stroller from a higher ground clearance jogging stroller to a lower ground clearance trailer stroller. This re-configuration is far from easy. It requires an extensive break down and reassembly of the stroller, including the seat, handle bar and front wheel forks. A convertible stroller is needed that can quickly and easily convert from a jogging to a trailer configuration, without extensive reassembly, as required by Garforth-Bles '171.

U.S. Pat. No. 5,695,208 to Baechlier addresses the problem of stability for jogger strollers that convert to towed trailer strollers with an extensive "conversion assembly." The conversion assembly is a complex upper frame attachment to the jogging stroller that utilizes the seat post and frame of the bicycle to provide counter weighted force downward on the rear wheels of the stroller. To inhibit tipping and rolling, FIGS. 10A and 10B of Baechlier '208 show how the attachment of the conversion assembly lowers the jogging stroller's center of gravity by shifting the terminal ends of the upper frame tubes forward into a trailer configuration. Baechlier '208 again illustrates the great need for a convertible stroller, but still fails to provide a stroller that can quickly and easily convert from a jogging to a trailer configuration, without an expensive additional upper frame assembly.

U.S. Pat. No. Design 379,333 to Jacobs shows a convertible two-seat trailer and jogging stroller that supposedly converts without a complex re-assembly. However, in the jogging configuration, as shown in FIG. 7 of Jacobs '333, the front of the stroller has a very low ground clearance and is ill-suited for rough terrain jogging. Therefore, Jacobs '333 fails to solve the problems addressed by Garforth-Bles '171 and Baechler '208. Jacobs '333 fails to teach how a trailer with a low center of gravity can convert to a three-wheeled jogging stroller that includes a higher ground clearance for rough terrain.

SUMMARY OF INVENTION

The invention provides a method and apparatus for a convertible trailer and stroller. The apparatus includes a pair of frame blocks. Each frame block has a frame mount, and the frame mounts are each attached to a frame member. Preferably, the frame members are frame components of a jogging stroller, each proximate the two rear wheels of the jogging stroller. The frame blocks are each attached to a wheel block at a wheel pivot. The wheel pivots interconnect the frame blocks to their respective wheel blocks. A pair of wheels having hub axle ends are also included in the apparatus. The hub axle ends are respectively received into a wheel bearing within each of the wheel blocks. The wheel blocks are rotatable about the respective block pivots to selectably raise or lower each wheel relative to the block pivots.

Additionally, the convertible trailer and stroller can comprise an upper bar. The ends of the upper bar end attach to the wheel blocks. The upper bar converts from a handle bar position to a roll bar position as a function of the pivotable rotations of the wheel blocks about the frame blocks.

Alternatively, the shaft of a conventionally configured jogging stroller could be modified with the convertible apparatus of the present invention.

According to one aspect of the invention, the convertible stroller and trailer achieves the required opposing functional characteristics for use either as a stroller or as a trailer.

Specifically, the stroller configuration of the present invention includes a high ground clearance for all terrain operation.

According to another aspect of the present invention, the convertible stroller and trailer while in the trailer configuration, includes a low and stable center of gravity.

According to still another aspect of the invention, the convertible stroller and trailer includes and an upper bar that converts from a handle bar position to a roll bar position. The roll bar position operates with the trailer configuration to protect a passenger of the convertible stroller and trailer in a tip over.

According to yet another aspect of the invention, a convertible stroller and jogger is provided that can quickly and easily convert from a jogging configuration to a trailer configuration, without an expensive additional upper frame assembly.

DETAILED DESCRIPTION OF SPECIFIC EMBODIMENTS

Figure 1:
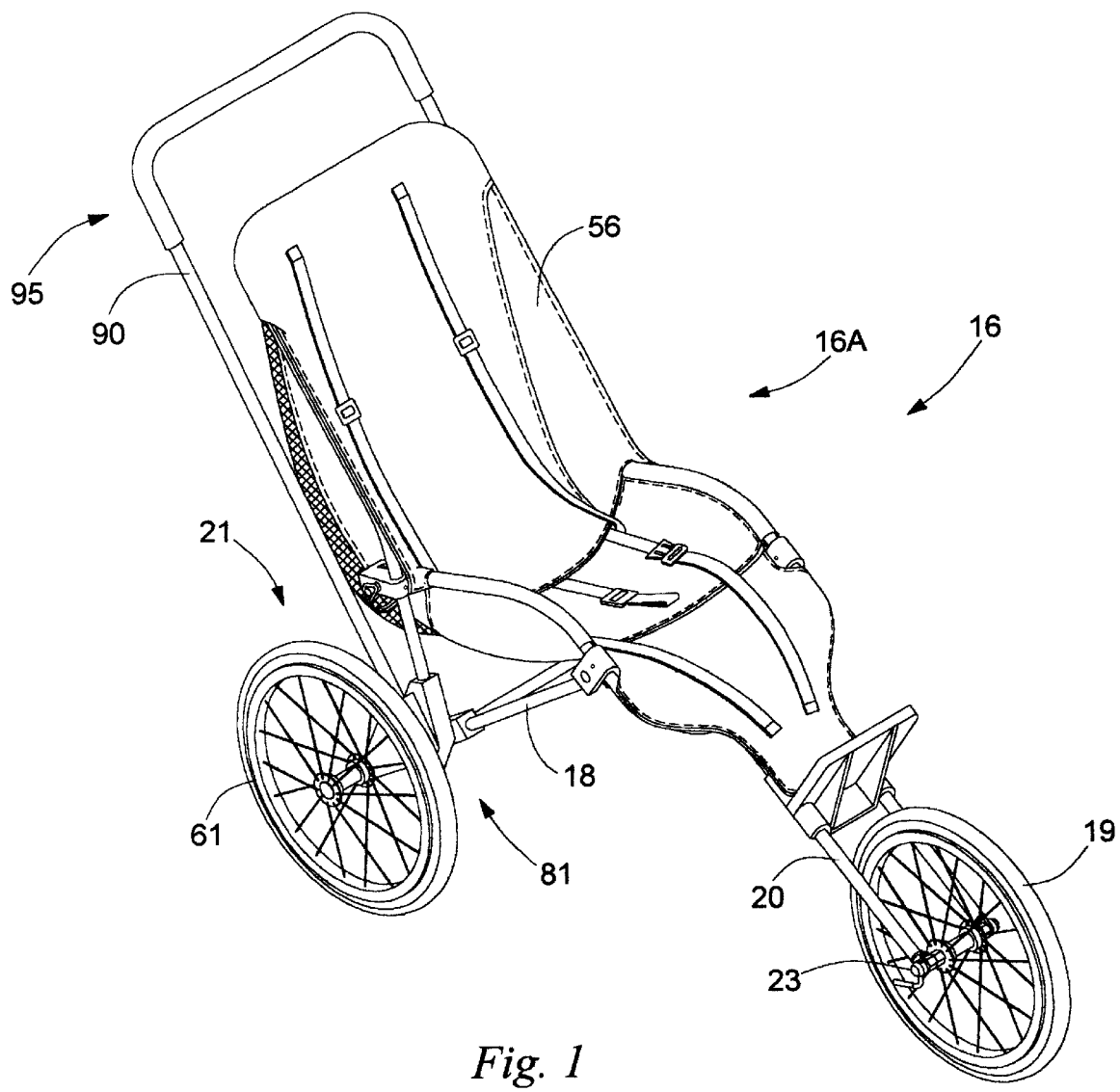
FIG. 1 is a perspective diagram of a convertible stroller, according to an embodiment of the present invention.

FIGS. 1 through 15 show a convertible stroller and trailer 16 according to a preferred embodiment of the present invention. As is typical for jogging type strollers, the convertible stroller and trailer of the present invention includes a pair of rear wheels 17 in a parallel, coaxial relationship, and mounted to a frame 18. The convertible stroller and trailer can be configured in either a stroller configuration 16A, illustrated in FIG. 1, or a trailer configuration 16B, illustrated in FIG. 2.

The stroller configuration 16A, is further illustrated in FIGS. 3, 5, 6, 7, 9, 10, 11, 12, 13 and 14. In the stroller configuration, the convertible stroller and trailer 16 includes and a front wheel 19, positioned ahead of the pair of rear wheels 17. The pair of rear wheels are attached to the frame 18, but can pivotably articulate in respect to the frame. This pivoting is provided by a first wheel system 21, detailed in FIGS. 11 and 12, paired with a second wheel system 22, detailed in FIGS. 13 and 14. The first wheel system and the second wheel system together operate to selectively raise or lower the first rear wheel 23 and the second rear wheel 24, respectively.

The convertible stroller and trailer 16 can easily convert from the stroller configuration 16A to the trailer configuration 16B. The trailer configuration is further illustrated in FIGS. 2, 4, 8 and 15. In the trailer configuration, the front wheel 19 is preferably removed from a front fork 20 of the convertible stroller and trailer. The front fork is preferably attached to the frame 18 of the convertible stroller and trailer. The front fork can then attach to a frame member of a bicycle or some similar trailer towing device (not shown). A conventional "quick release" hub system 23 is preferably utilized as shown in FIGS. 1, and 3 through 10. The quick release hub allows the user to remove the front wheel easily, or attach the front wheel for compact storage or conversion between the stroller configuration and the trailer configuration. Additionally, with the quick release hub, the user can easily attach the front fork to a trailer mount (not shown) on the frame member of the trailer towing device.

A key feature of the present invention is the ability to selectively raise or lower the pair of rear 10 wheels 17 with respect to the frame 18 of the convertible stroller and trailer 16. As detailed in FIG. 11, the first wheel system 21 includes a first frame block 25 having a first frame mount 26. The first frame mount is attached to a first frame member 28. A first wheel block 30 pivotably interconnect to the first frame block at a first block pivot 32. The first wheel block also includes a first wheel bearing 34.

Figure 13:
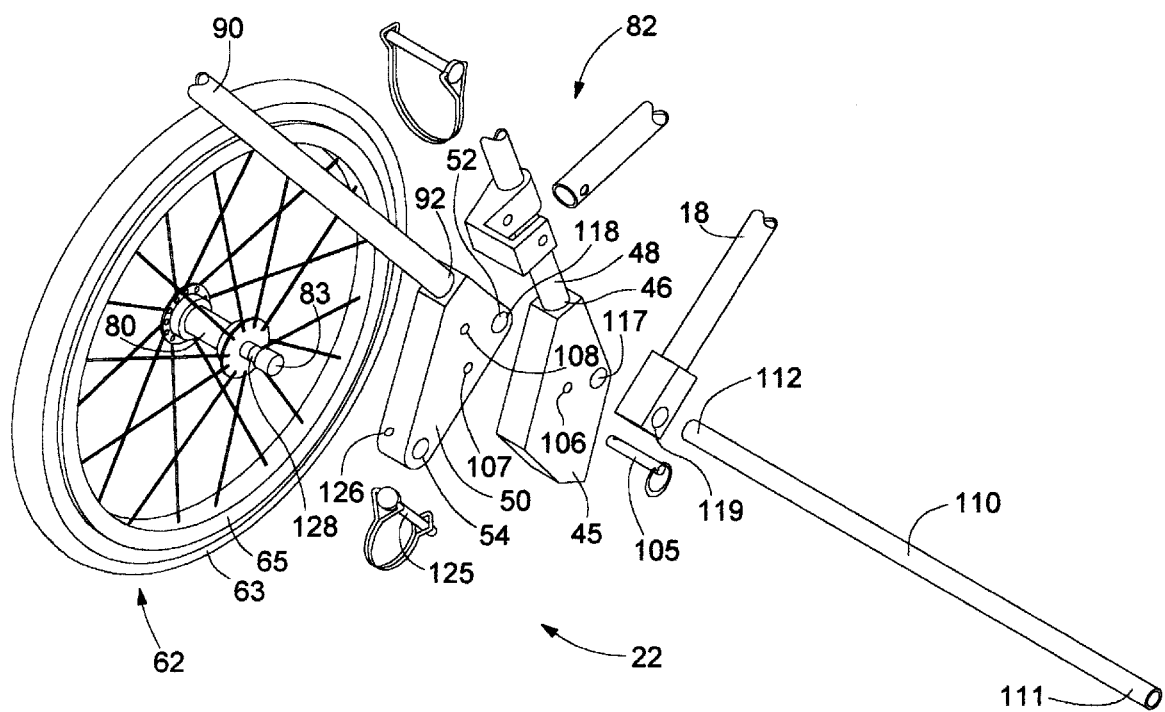
FIG. 13 is a partial exploded perspective diagram of a convertible stroller, according to an embodiment of the present invention.

As detailed in FIG. 13, the second wheel system 22 includes a second frame block 45 having a second frame mount 46. The second wheel system is positioned on the frame 18 of the convertible stroller and trailer 16 opposite to the first wheel system 21. The second frame mount is attached to a second frame member 48. A second wheel block 50 pivotably interconnects to the second frame block at a second block pivot 52. The second wheel block also includes a second wheel bearing 54.

The first wheel block 30, the second wheel block 50, the first frame block 25 and the second frame block 45 are shown in FIGS. 1 through 15 as milled from a plastic resin material, such as "Nylatron". Preferably these components are injection molded or alternatively cast from a thermosetting elastomer, such as a polyurethane. Most preferably these components are injection molded from a nylon based material. Also alternatively, these components could be formed from block of metal, preferably a lightweight aluminum, titanium or similar appropriate alloy.

The convertible stroller and trailer 16 of the present invention includes a frame 55, specifically shown in FIGS. 3, 4, 7, 8, 9 and 10. Most preferably, the first frame member and the second frame member are included in the frame 18 of the convertible stroller and trailer. The frame is preferably manufactured from a tubular material, and most preferably fabricated from an aluminum tubing. A 6063, T832 aluminum tubing, as manufactured by EASCO of Girard, Ohio, U.S.A., and having an approximate wall thickness of 0.058 inches (1.5 mm). The frame is preferably formed to receive a passenger seat 56, which is shown in FIGS. 1, 2, 5, and 6. Alternatively, the passenger seat may be replaced by a bag, cargo container or an enclosure. The first frame member 28 and the second frame member 48 are portions of the frame that attach to the first wheel system 21 and the second wheel system 22, respectively.

The first wheel system 21 also includes a first wheel 61, and the second wheel system 22 likewise includes a second wheel 62. The first wheel and the second wheel together form the pair of rear wheels 17. The pair of rear wheels are preferably of a typical configuration and each include a tire 63, affixed to a spoked rim 65.

Figure 11:
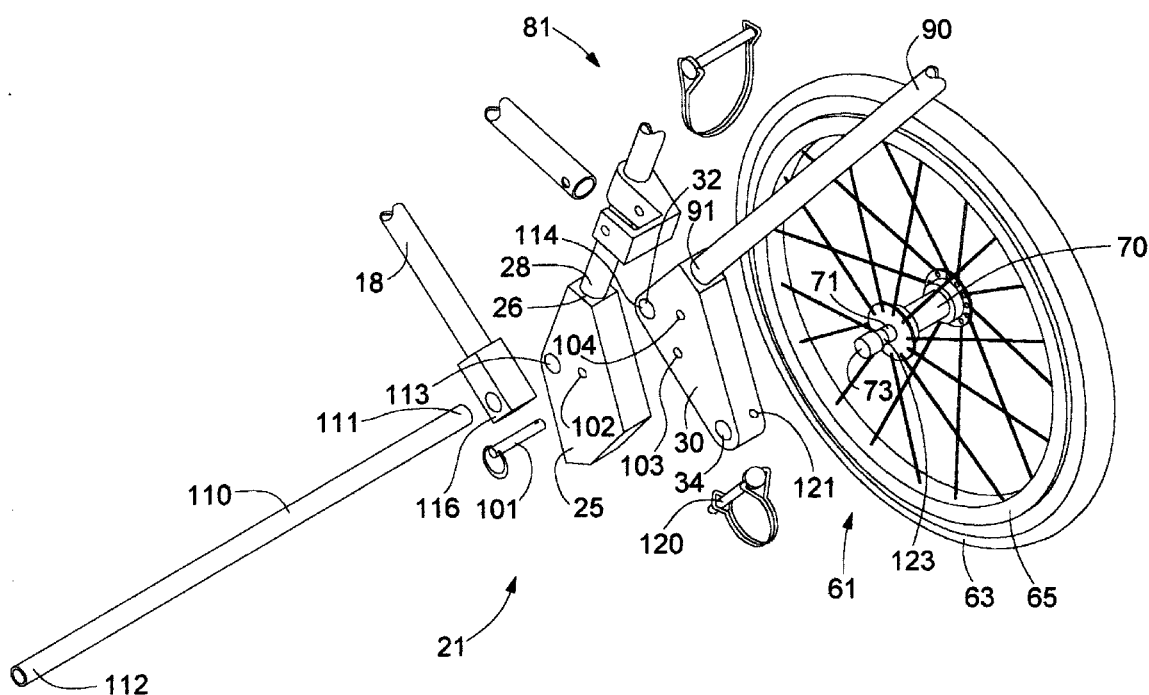
FIG. 11 is a partial exploded perspective diagram of a convertible stroller, according to an embodiment of the present invention.

As detailed in FIG. 11, the first wheel 61 includes a first hub 70, positioned at the center of its spoked rim 65. The first hub receives a first axle piece 71. The first axle piece has a first axle end 73 that extends from the first hub. The first hub axle end is receivable into the first wheel bearing 34 of the first wheel block 30, as detailed in FIG. 12

Similar to the first wheel 61, the second wheel 62 is configured to include a second hub 80, positioned at the center of its spoked rim 65, as detailed in FIG. 13. The second hub receives a second axle piece 81. The second axle piece has a second axle end 83 that extends from the second hub. The second hub axle end is receivable into the second wheel bearing 54 of the second wheel block 50, as detailed in FIG. 14.

The first axle piece 71 and the second axle piece 81 are both preferably formed from short lengths of steel rod. Most preferably, the steel rod is a stainless steel alloy selected for high tensile strength and resistance to rust.

Figure 12:
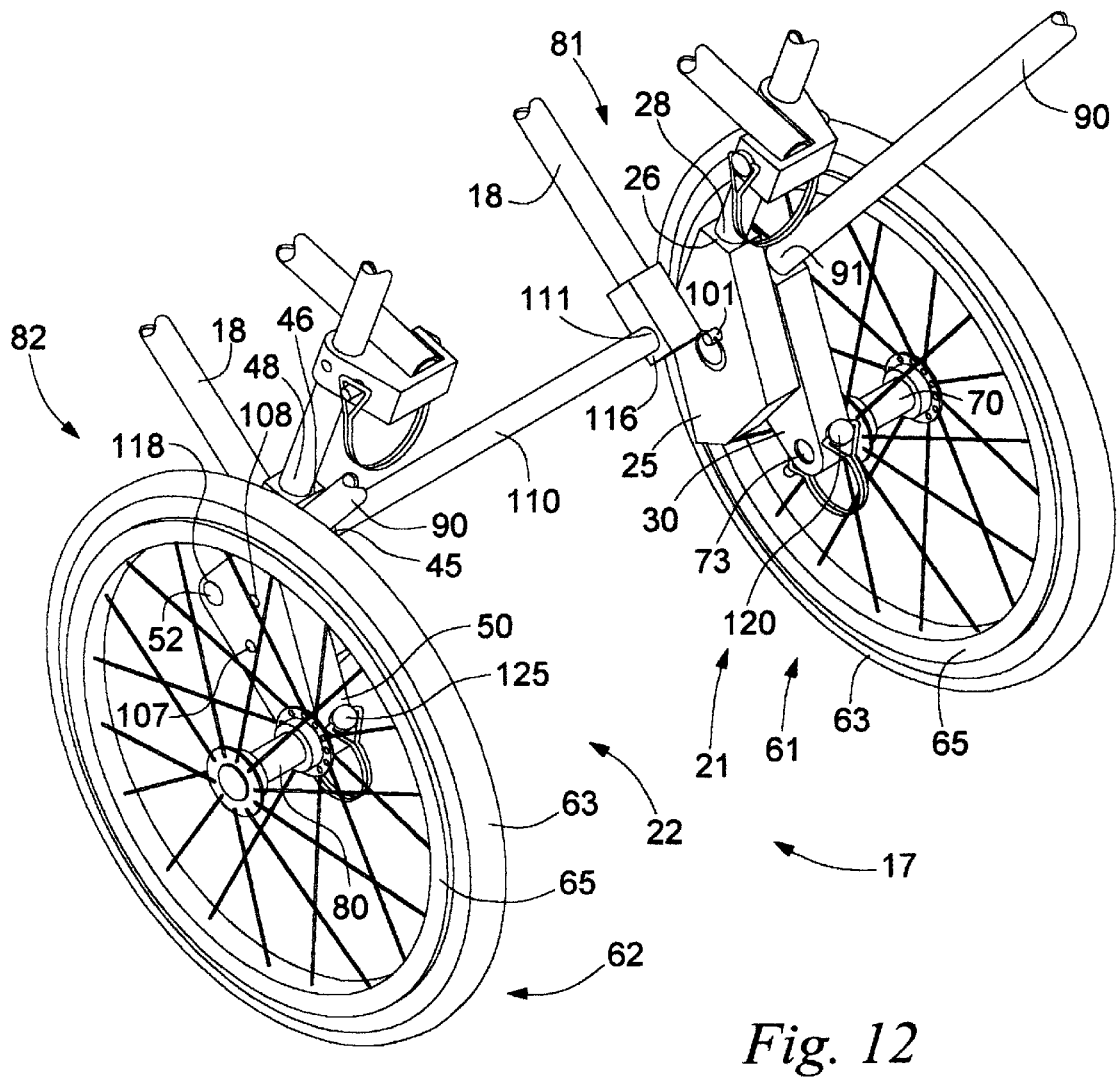
FIG. 12 is a partial perspective diagram of a convertible stroller, according to another embodiment of the present invention.

The first wheel block 30 is rotatable about the first block pivot 32 to selectably raise or lower the first wheel 61 relative to the first block pivot. FIGS. 11 and 12 detail the first wheel system in a lowered first wheel position 81 that corresponds to the stroller configuration 16A, with the first block rotated about the first block pivot to lower the first wheel relative to the first block pivot.

Figure 14:
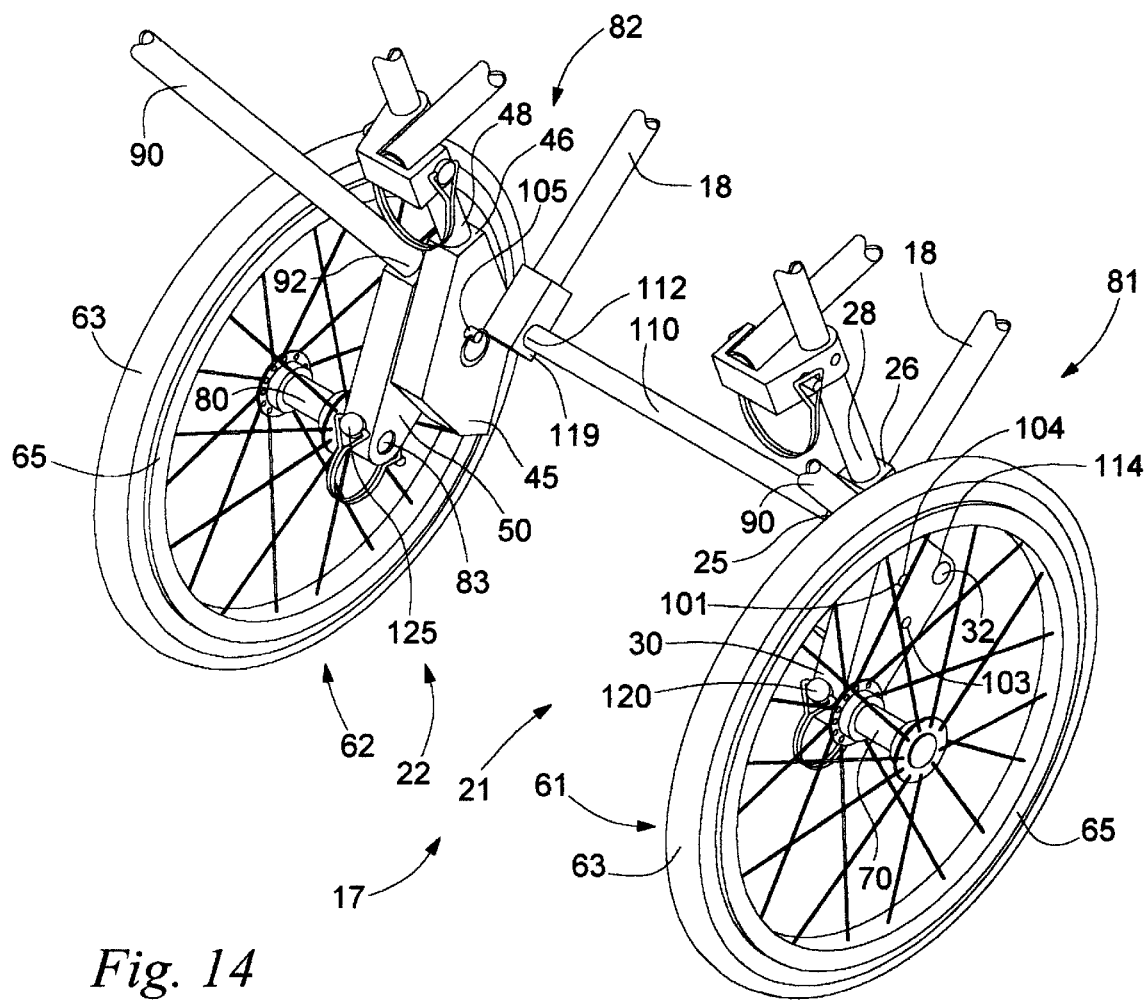
FIG. 14 is a partial perspective diagram of a convertible stroller, according to an embodiment of the present invention.

Conversely, the second wheel block 50 is rotatable about the second block pivot 52 to selectably raise or lower the second wheel 62 relative to the second block pivot 52. FIGS. 13 and 14 detail the second wheel system 22 in a lowered second wheel position 82 that also corresponds to the stroller configuration 16A, with the second block rotated about the second block pivot to lower the second wheel relative to the second block pivot.

Figure 15:
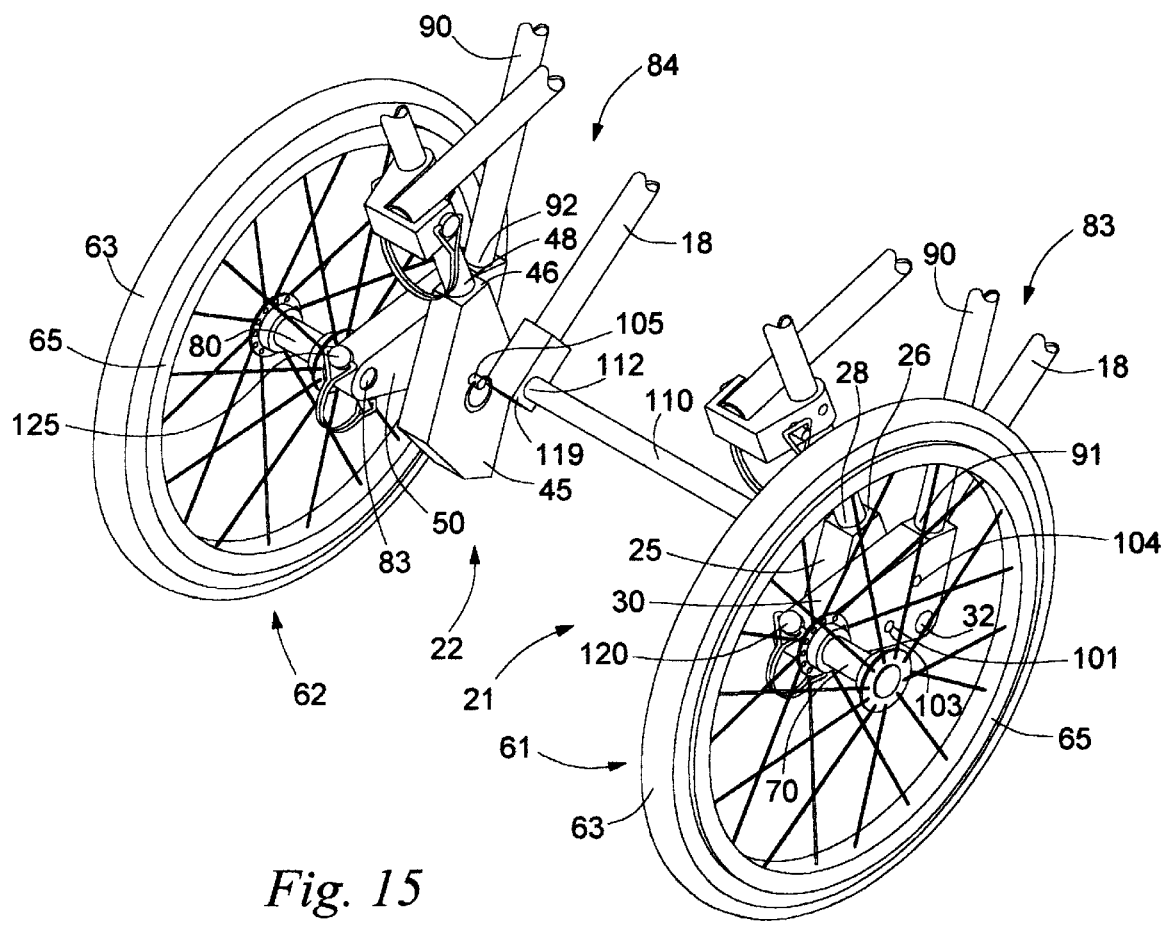
FIG. 15 is a partial perspective diagram of a convertible trailer, according to an embodiment of the present invention.

FIG. 15 details the first wheel system 21 in a raised first wheel position 83 that corresponds to the trailer configuration 16B, with the first wheel block 30 rotated about the first block pivot 32 to raise the first wheel 61 relative to the first block pivot. FIG. 15 also details the second wheel system 22 in a raised second wheel position 84 that also corresponds to the trailer configuration, with the second wheel block 50 rotated about the second block pivot 52 to raise the second wheel 62 relative to the second block pivot.

Figure 9:
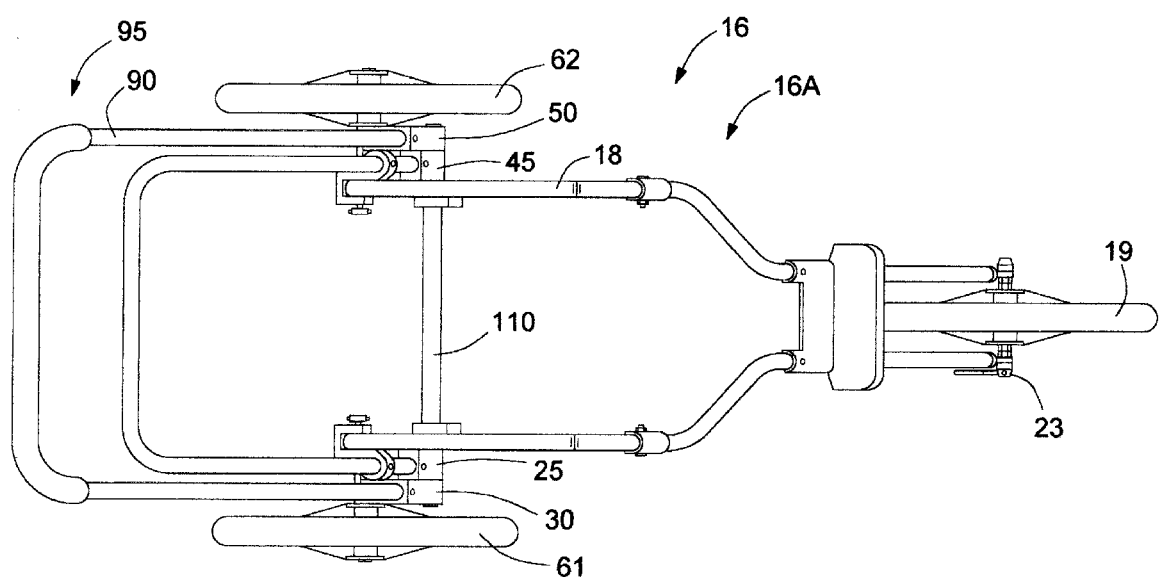
FIG. 9 is a plan view diagram of a convertible stroller, according to an embodiment of the present invention.
Figure 10:
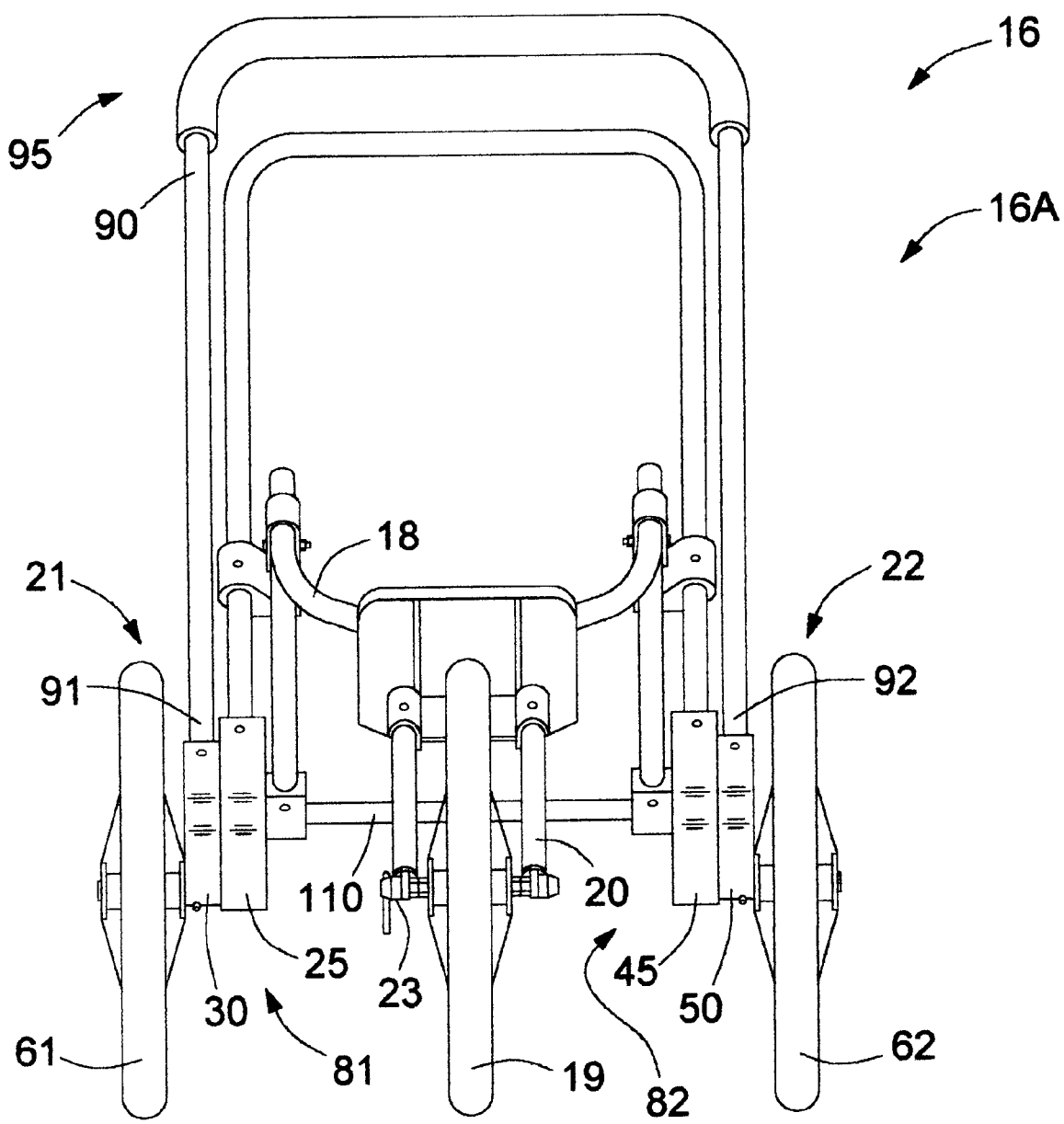
FIG. 10 is a front elevation view of a convertible stroller, according to an embodiment of the present invention.

The stroller configuration 16A is also shown in FIGS. 1, 3, 5, 6, 7, 9 and 10. In a preferred embodiment of the present invention the convertible stroller and trailer 16 includes an upper bar 90 in the stroller configuration. With the upper bar in the stroller configuration, the upper bar can function as a handle bar, and the convertible stroller and trailer can function as a stroller. A user of the present invention can push on the handle bar and directly apply pushing or pulling force to the pair of rear wheels 17 of the convertible stroller and trailer. As best shown in FIG. 9, the upper bar is preferably connected to both the first wheel block 30 and the second wheel block 50. As discussed above, the first wheel block is connected to the first axle piece 71 of the first wheel 61 and the second wheel block is connected to the second axle piece 81 of the second wheel 62. With many jogging strollers, the handle bar is attached to the passenger seat 56 portion of the frame 18. By applying force to the upper bar that is attached low on the convertible stroller and trailer, as is preferred in the present invention, the user can avoid toppling the stroller while pushing. Additionally, the passenger is more comfortable when the user pushes and pulls on portions of the frame that are not directly connected to the passenger seat supporting portions of the frame.

In the stroller configuration 16A, the upper bar 90 is essentially a handle bar for pushing the stroller. As detailed in FIGS. 11 and 13, the upper bar includes a first bar end 91 and a second bar end 92. The first bar end attaches to the first wheel block 30, and the second bar end attaches to the second wheel block 50. The upper bar converts from a handle bar position 95 in the stroller configuration, well shown in FIGS. 1 and 3, to a roll bar position 96 in the trailer configuration 16B, clearly shown in FIGS. 2 and 4. In the trailer configuration, the upper bar is essentially a roll bar for protecting the passenger within the convertible trailer and stroller in case of tipping or rolling over.

The conversion of the upper bar 90 from the handle bar position 95 to the roll bar position 96 is a function of the pivotable rotation of the first wheel block 30 about the first frame block 25 and the pivotable rotation of the second wheel block 50 about the second frame block 45. Additionally, as the upper bar pivots forward, toward the front fork 20 of the convertible stroller and trailer 16, the pair of rear wheels also pivot upward, thereby lowering the passenger seat 56.

Figure 7:
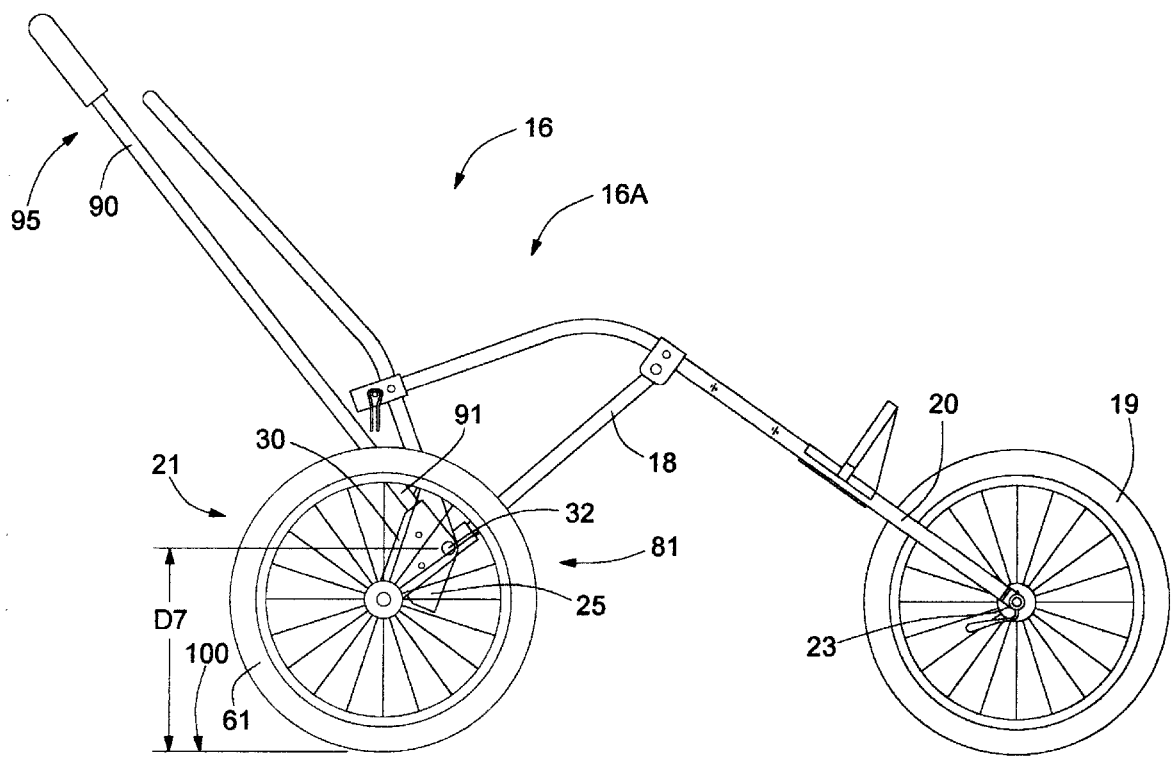
FIG. 7 is a side elevation view diagram of a convertible stroller, according to an embodiment of the present invention.
Figure 8:
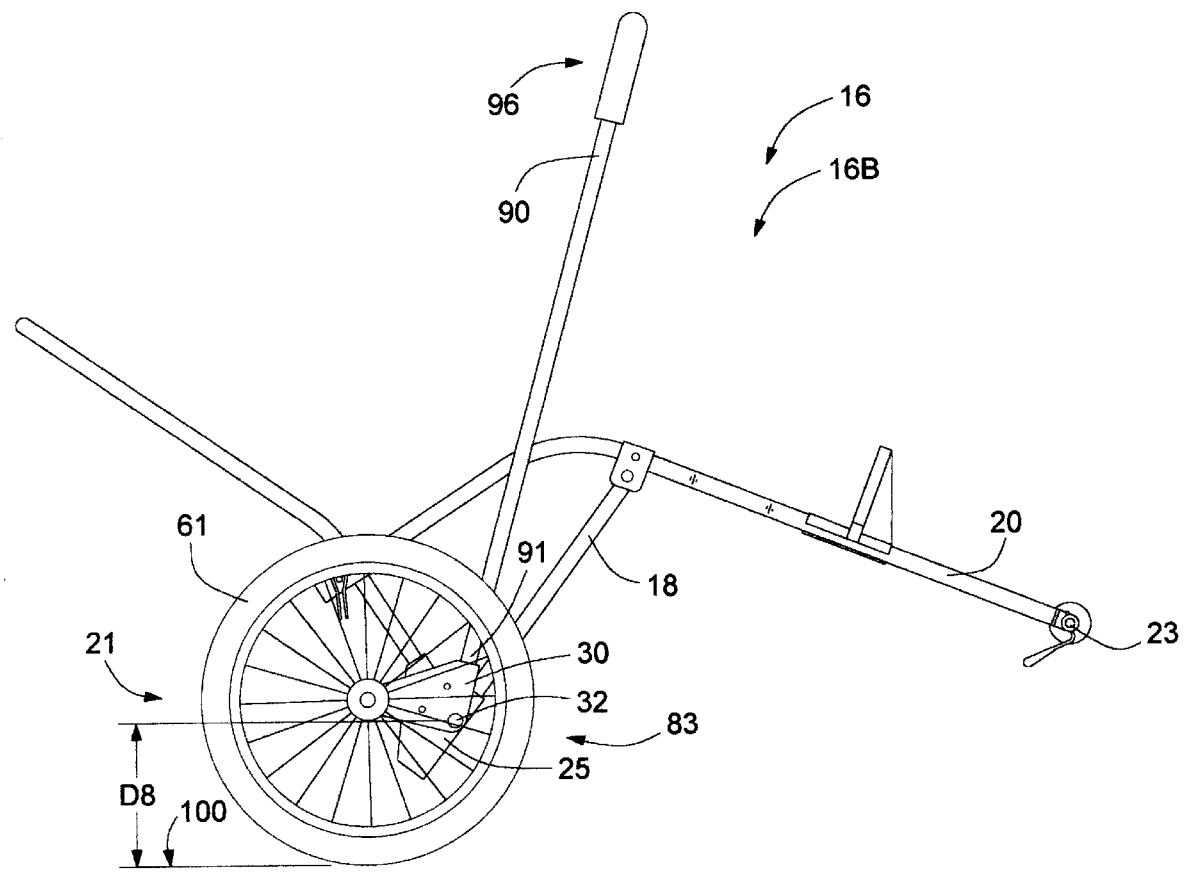
FIG. 8 is a side elevation view diagram of a convertible trailer, according to an embodiment of the present invention.

An additional benefit of the conversion from the stroller configuration 16A to the trailer configuration 16B is shown in FIGS. 7 and 8. In FIGS. 7 and 8, a ground surface 100 is shown. The ground surface supports the second wheel 62. A first clearance height D7 is noted in FIG. 7. The first clearance height is the distance between the ground surface 100 and the second block pivot 52 of the convertible stroller and trailer 16 in the stroller configuration. The conversion from the stroller configuration to the trailer configuration includes pivoting the first wheel block 30 and the second wheel block 50 about the respective first block pivot 32 and the second block pivot 52. This conversion lowers the passenger seat 56 by lowering the entire frame 18.

A second clearance height D8 is noted in FIG. 8. The second clearance height is the distance between the ground surface 100 and the second block pivot 52 in the trailer configuration 16B. The second clearance height is significantly less than the first clearance height D7. This reduction in clearance form the ground surface alters the handling characteristics of the convertible stroller and trailer 16.

In the raised stroller configuration 16A, a high ground clearance is achieved, to provide easy maneuverability over curbs and obstructions. Whereas in the lowered, trailer configuration 16B, a low center of gravity is achieved, to provide a stable trailer platform at the greater speeds and smoother surfaces as normally encountered by bicycles. Conventional jogging strollers cannot lower their centers of gravity to better provide a stable ride for the trailer passenger. The pivoting rear wheel system of the present invention provides for a lowering of the stroller's center of gravity for trailer applications.

The first block pivot 32 is held in position by a first block pivot set pin 101. The first block pivot set pin is received into a first frame block pivot hole 102. The first block pivot set pin then can enter the first wheel block 30 in either a first raised wheel block pivot hole 103 or a first lowered wheel block pivot hole 104. The first raised wheel block pivot hole is positioned below the first lowered wheel block pivot hole in the first wheel block, as detailed in FIG. 11. The first block pivot set pin also preferably includes a spring stop for holding the first pin in position.

Similarly, the second block pivot 52 is held in position by a second block pivot set pin 105. The second block pivot set pin is received into a second frame block pivot hole 106. The second block pivot set pin then can enter into the second wheel block 50 in either a second raised wheel block pivot hole 107 or a second lowered wheel block pivot hole 108. The second raised wheel block pivot hole is positioned below the second lowered wheel block pivot hole in the second wheel block, as detailed in FIG. 13. The second block pivot set pin also preferably includes a spring stop for holding the second pin in position.

When the first block pivot set pin 101 and the second block pivot set pin 105 are inserted into the first lowered wheel block pivot hole 104 and second lowered wheel block pivot hole 108, respectively, the first wheel system 21 and second wheel system 22 of the convertible stroller and trailer 16 are in the stroller configuration 16A, as shown in FIG. 1, and further detailed in FIGS. 12 and 14. This wheel lowered position also places the upper bar 90 in the handle bar position 95.

Figure 2:
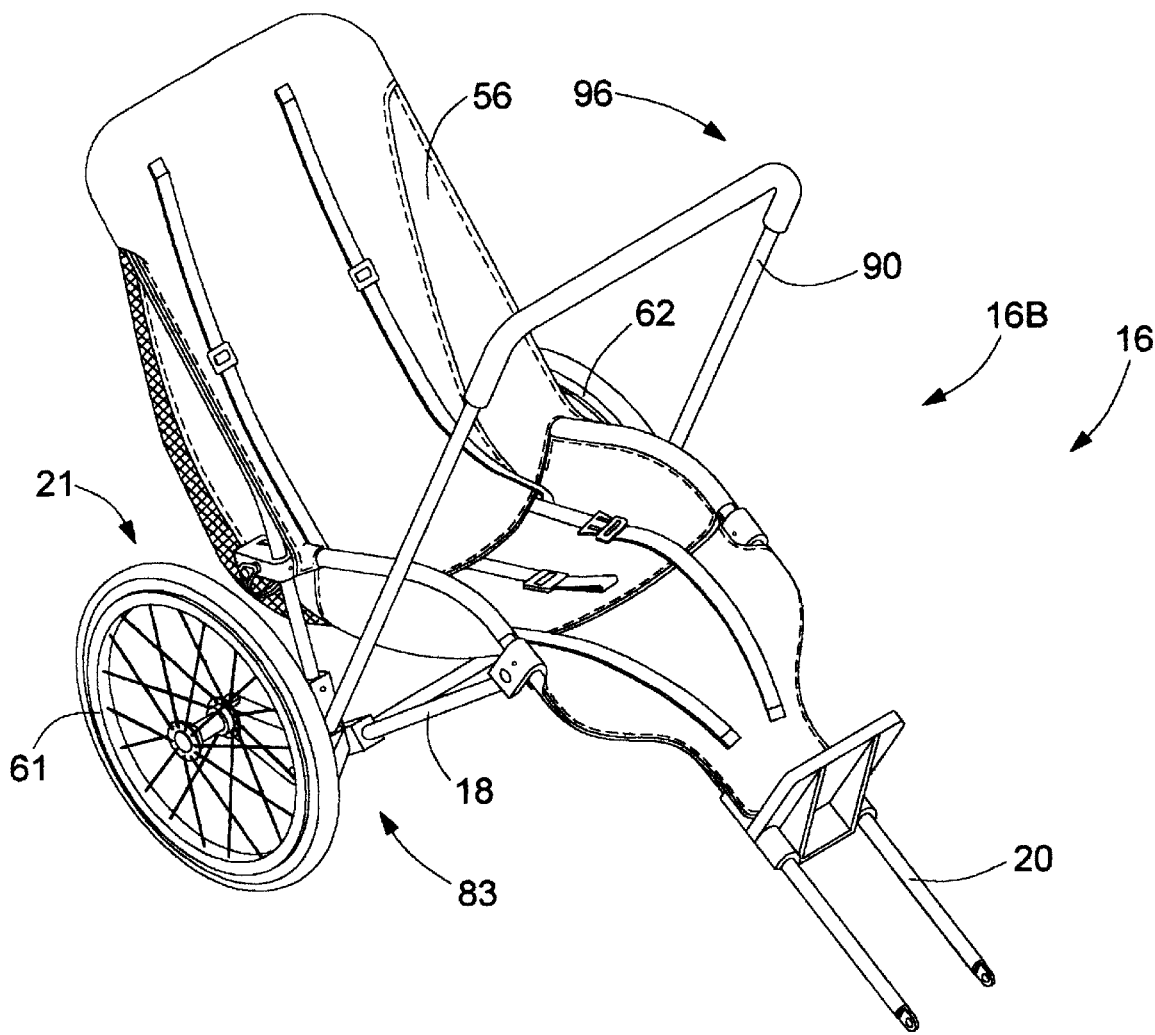
FIG. 2 is a perspective diagram of a convertible trailer, according to an embodiment of the present invention.
Figure 3:
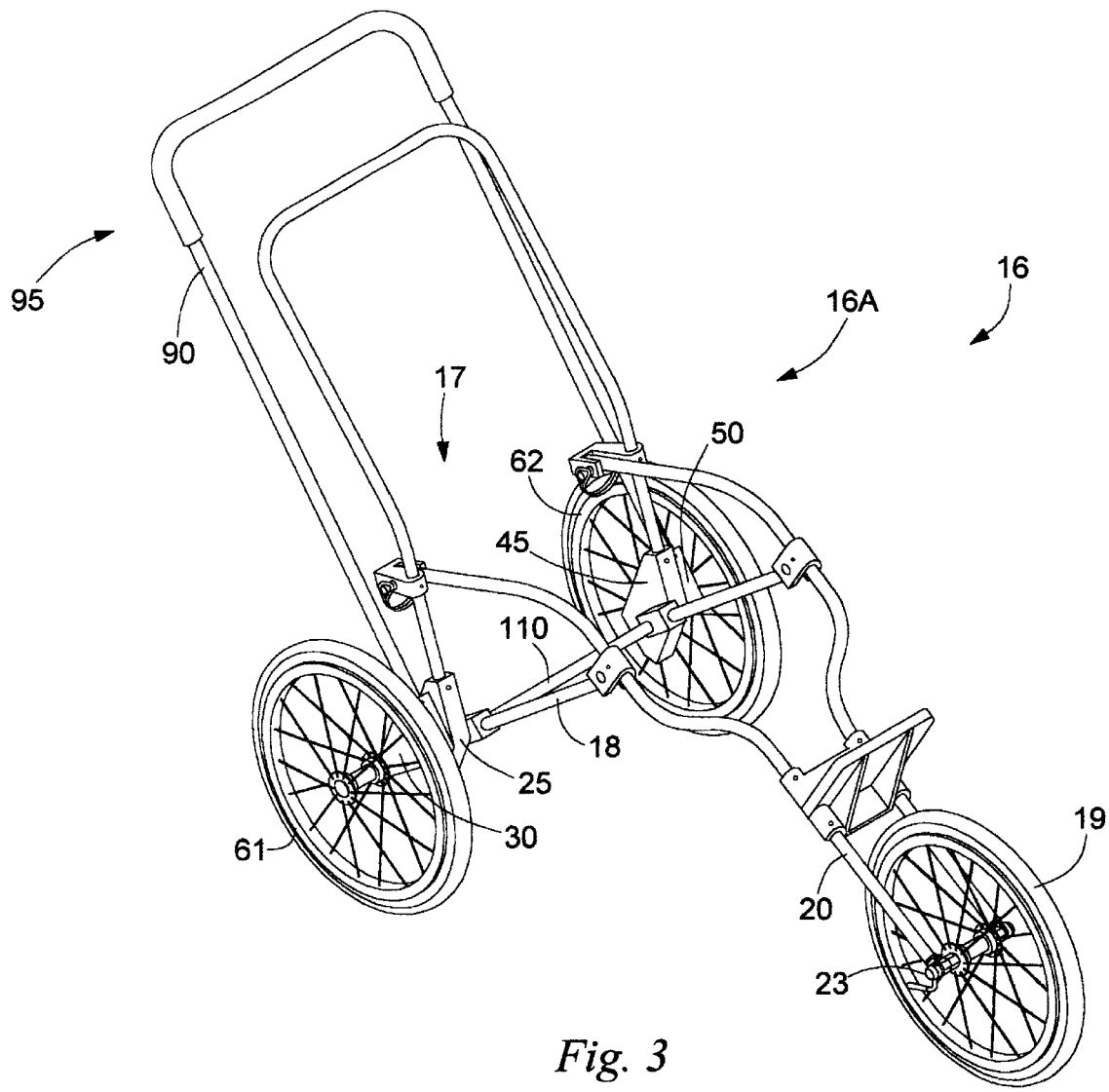
FIG. 3 is a perspective diagram of a convertible stroller, according to an embodiment of the present invention.
Figure 4:
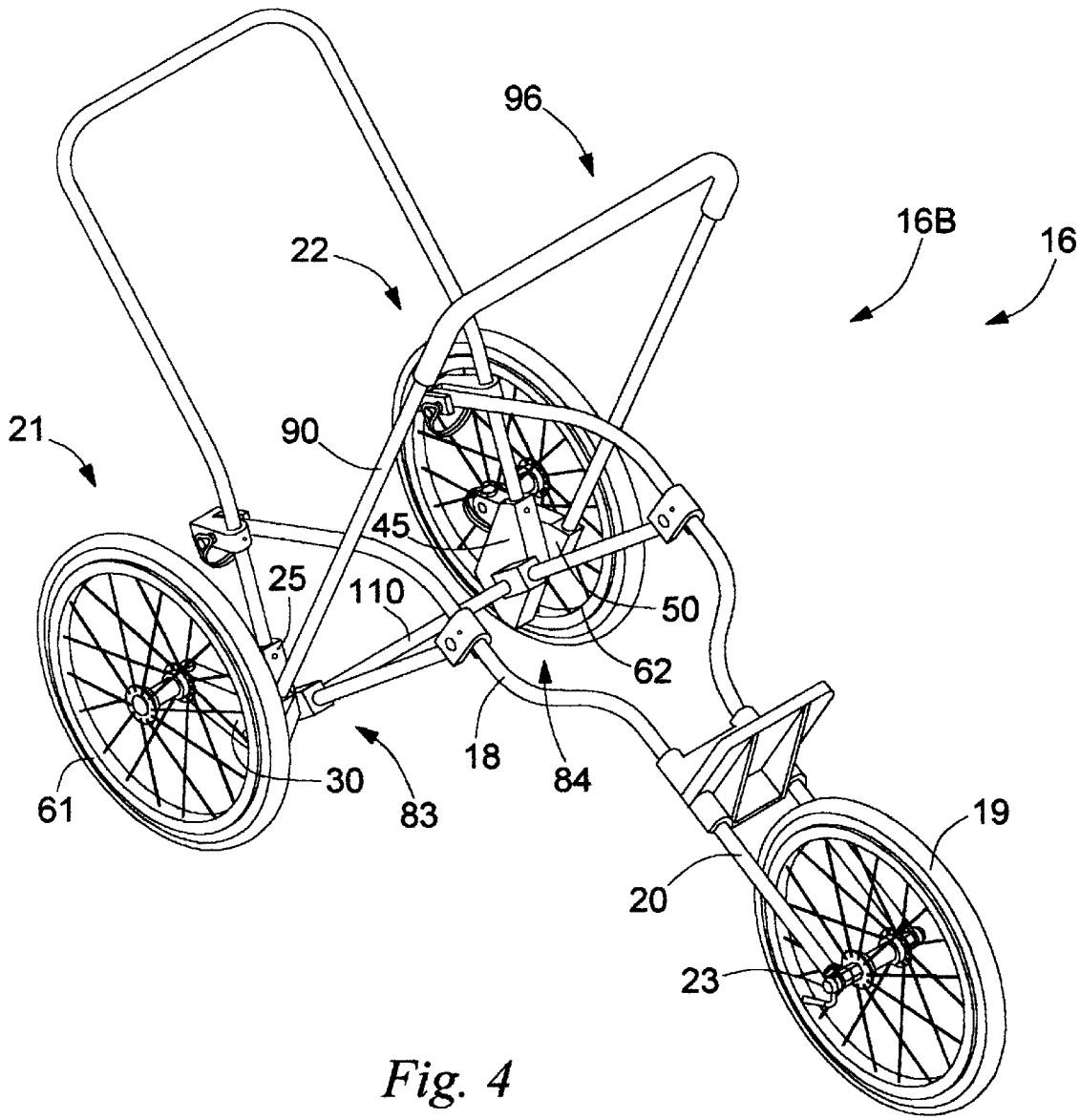
FIG. 4 is a perspective diagram of a convertible trailer, according to an embodiment of the present invention.
Figure 5:
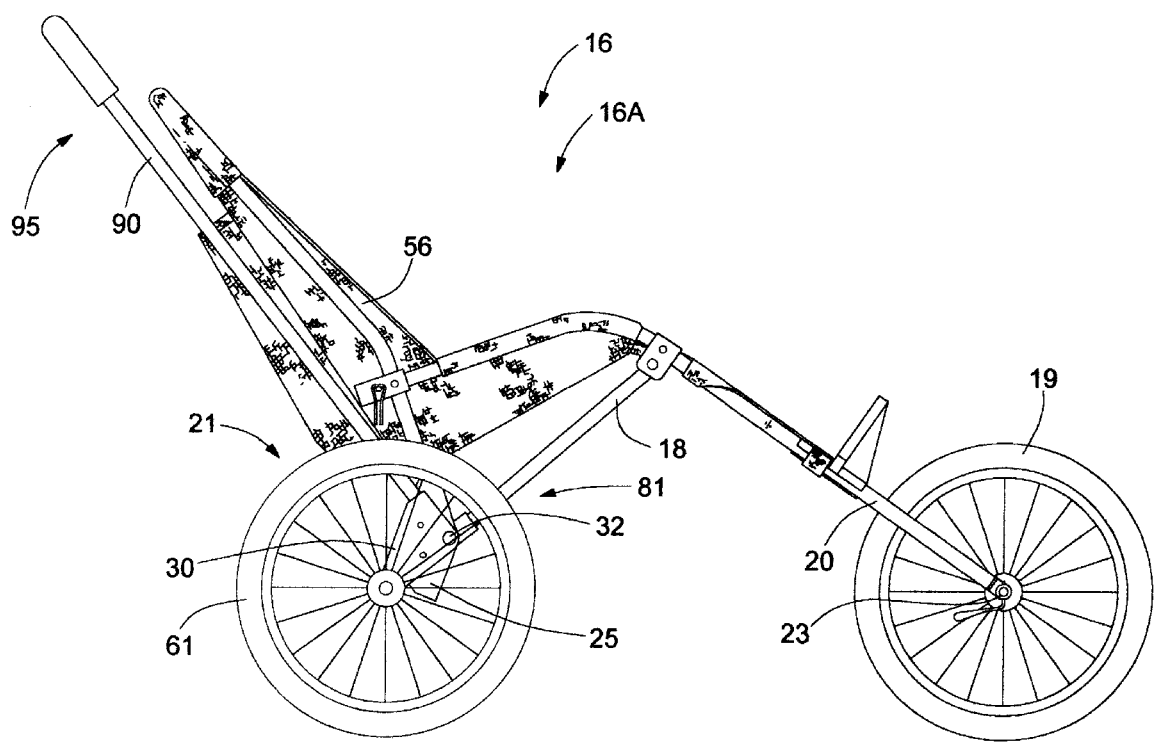
FIG. 5 is a side elevation view of a convertible stroller, according to an embodiment of the present invention.
Figure 6:
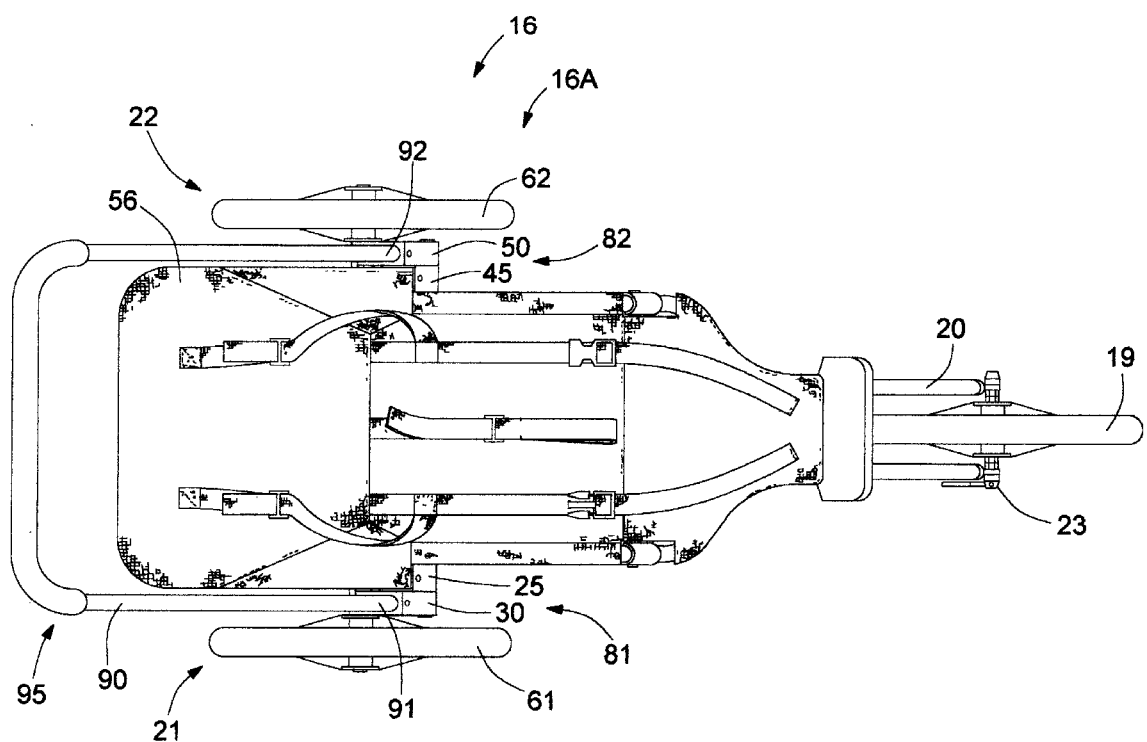
FIG. 6 is a plan view diagram of a convertible stroller, according to an embodiment of the present invention.

When the first block pivot set pin 101 and the second block pivot set pin 105 are inserted into the first raised wheel block pivot hole 103 and second raised block pivot hole 107, respectively, the first wheel system 21 and second wheel system 22, the convertible stroller and trailer 16 is in the trailer configuration 16B, as shown in FIG. 2 and detailed in FIG. 15. This wheel raised position also places the upper bar 90 in the roll bar position 96, if the rotatable and convertible upper bar is employed, as preferred.

Additionally, the convertible stroller and trailer preferably includes a shaft member 110, which provides a common axis for the first block pivot 32 and the second block pivot 52. As shown in FIGS. 11 and 13, the shaft member has a first shaft end 111 and a second shaft end 112.

The first shaft end 111 preferably inserts through a first frame block bearing 113 in the first frame block 25 and then into a first wheel block bearing 114 in the first wheel block. The first shaft end, the first frame block bearing and the first wheel block bearing together form the first block pivot 32. In a preferred embodiment of the present invention, the first shaft end can also penetrate through a first lower frame mount 116, which is also shown in FIGS. 11 and 12.

The second shaft end 112 preferably inserts through a second frame block bearing 117 in the second frame block 45 and then into a second wheel block bearing 118 in the second wheel block 50. The second shaft end, the second frame block bearing and the second wheel block bearing together form the second block pivot 52. In a preferred embodiment of the present invention, the second shaft end can also penetrate through a second lower frame mount 119, which is also shown in FIGS. 13 and 14.

The first lower frame mount 116 and the second lower frame mount 119 provide additional support for the frame 18 of the convertible stroller and trailer 16. The first lower frame mount and the second lower frame mount both preferably attach the frame to the shaft 110 as an additional point of support to the first frame mount and the second frame mount of the first frame block and the second frame block, respectively. For additional or alternative points of support, the frame can be mounted to the shaft, the first frame block or the second frame block at additional sites.

The first wheel 61 is preferably removable from the first wheel bearing 34 within the first wheel block 30. As shown in FIGS. 11 and 12, a first axle set pin 120 is utilized to lock the first axle piece into the first wheel block. When inserted into a first axle set pin hole 121 in the first wheel block, the first axle pin is received into a first set pin groove 123. The first set pin groove is located proximate the first axle end 73 to prevent lateral movement of the first axle piece within the first wheel bearing.

Similarly, the second wheel 62 is also preferably removable from the second wheel bearing 54 within the second wheel block 50. As shown in FIGS. 13 and 14, a second axle set pin 125 is utilized to lock the second axle piece into the second wheel block. When inserted into a second axle set pin hole 126 in the second wheel block, the second axle pin receives into a second axle set pin groove 128. The second axle set pin groove is located proximate the second axle end 83 to prevent lateral movement of the second axle piece within the second wheel bearing.

Alternatively, the shaft of a conventionally configured jogging stroller, which would be similar to the shaft 110 as shown in FIGS. 11 through 15, could be modified with the convertible apparatus of the present invention. The first shaft end 111, could be retrofitted with a first frame block 25. The first frame block could then receive a first wheel block 30 at the first block pivot 32, and the first wheel 61 received into the first wheel bearing 34. The second shaft end 112 could likewise be retrofitted with a second frame block 45. The second frame block could then receive a second wheel block 50 at the second block pivot 52, and the second wheel 62 received into the second wheel bearing 54.

Also alternatively, the modified conventional jogging stroller could include the upper bar 90 to function as the roll bar in the trailer configuration 16B. The upper bar, having the first bar end 91 received into the first wheel block 30 and the second bar end 92 received into the second wheel block 50, as detailed in FIGS. 11 through 15, could pivot from the handle bar position 95 in the stroller configuration 16A, to a roll bar position 96 in the trailer configuration. In the stroller configuration, the upper bar would preferably be pivoted to a close proximity to the push bar of the conventional stroller, while in the roll bar position, the upper bar would essentially function as a roll bar for protecting the passenger within the jogging stroller in case of tipping or rolling over.

FIGS. 11 through 15 detail the use of bracket type pins for the first axle set pin 120, and the second axle set pin 125. Alternative pin configurations or types could be utilized to achieve the same function as the bracketed pin type, as shown herein.

The method of the present invention includes the steps of converting the convertible stroller and trailer 16 of the present invention from the stroller configuration 16A to the trailer configuration 16B, or from the trailer configuration to the stroller configuration. The method begins with the convertible stroller and trailer with the pair of rear wheels 17 locked and in the lowered position, as shown in FIGS. 1, 3, 5, 6, 7, 9, 10, 12 and 14.

The first wheel block 30 is unlocked from the lowered first wheel position 81. This can be accomplished by removing the first block pivot set pin 101 from the first lowered wheel block pivot hole 104, as shown in FIG. 11, to free the rotation of the first wheel block with respect to the first frame block 25. Additionally, the second wheel block is unlocked from the second wheel lowered position 82. This can be accomplished by removing the second block pivot set pin 105 from the lowered wheel block pivot hole 108, as also shown in FIG. 13, to free the rotation of the second wheel block with respect to the second frame block 45.

The first wheel block 30 and the second wheel block 50 are simultaneously rotated about the first block pivot and the second block pivot respectively, to the first wheel raised position and the second wheel raised position. This action lowers the frame 18 in relation to the pair of rear wheels 17 and thereby lowers the center of gravity for the convertible stroller and trailer 16, which is desirable in the trailer configuration 16B.

The first wheel block 30 is now locked in the raised first wheel position 83. This can be accomplished by pushing the first block pivot set pin 101 back, further into the first frame block pivot hole 102, and into the first raised wheel block pivot hole 103, as shown in FIG. 15. The first block pivot set pin secures the first wheel block with respect to the first frame block 25, and so prevents the first wheel 61 from rotating out of the raised first wheel position.

Additionally, the second wheel block 50 is simultaneously locked in the second wheel raised position 84. This can be accomplished by pushing the second block pivot set pin 105 back, further into the second frame block pivot hole 106, and into the second raised wheel block pivot hole 107, as shown in FIG. 15. The second block pivot set pin secures the second wheel block with respect to the second frame block 45, and so prevents the second wheel 62 from rotating out of the second wheel raised position.

The reverse of the above method is preformed to convert from the trailer configuration to the stroller configuration. In the trailer configuration, the first wheel and the second wheel are in the raised first wheel position and the raised second wheel position, respectively, while for conversion, the first wheel and the second wheel lower to the lowered first wheel position and the lowered second wheel position.

With the convertible stroller and trailer 16 having the pair of rear wheels 17 locked and in the raised position, as shown in FIGS. 2, 4, 8 and 15, the first wheel block 30 is unlocked from the raised first wheel position 83. This can be accomplished by removing the first block pivot set pin 101 from the first raised wheel block pivot hole 103, as shown in FIG. 11, to free the rotation of the first wheel block with respect to the first frame block 25. Additionally, the second wheel block is unlocked from the raised second wheel position 82. This can be accomplished by removing the second block pivot set pin 105 from the raised wheel block pivot hole 107, as also shown in FIG. 13, to free the rotation of the second wheel block with respect to the second frame block 45.

The first wheel block 30 and the second wheel block 50 are simultaneously rotated about the first block pivot and the second block pivot respectively, to the lowered first wheel position 81 and the lowered second wheel position 82. This action raises the frame 18 in relation to the pair of rear wheels 17 and thereby increases the clearance to the ground surface 100, as shown in FIG. 7, for the convertible stroller and trailer 16, which is desirable in the stroller configuration 16A.

The first wheel block 30 is now locked in the lowered first wheel position 81. This can be accomplished by pushing the first block pivot set pin 101 back, further into the first frame block pivot hole 102, and into the first lowered wheel block pivot hole 104, as shown in FIG. 12. The first block pivot set pin secures the first wheel block with respect to the first frame block 25, and so prevents the first wheel 61 from rotating out of the lowered first wheel position.

Additionally, the second wheel block 50 is simultaneously locked in the lowered second wheel position 82. This can be accomplished by pushing the second block pivot set pin 105 back, further into the second frame block pivot hole 106, and into the lowered second wheel block pivot hole 108, as shown in FIG. 14. The second block pivot set pin secures the second wheel block with respect to the second frame block 45, and so prevents the second wheel 62 from rotating out of the lowered second wheel position.

The convertible stroller and trailer 16 of the present invention can also include the upper bar 90 that can function in either the handle bar position 95 or the roll bar position 96. The desired function of the upper bar depends on whether the convertible stroller and trailer is in the stroller configuration 16A or the trailer configuration 16B.

The method of converting the upper bar 90 from the rearward, handle bar position 95 to the forward, roll bar position 96 includes the steps of unlocking both the first wheel block 30 from the first frame block 25 and the second wheel block 50 from the second frame block 45. This is preferably achieved, as discussed above, by pulling the first block pivot set pin 101 and the second block pivot set pin 105 from the raised first wheel block pivot hole 103 and the raised second wheel block pivot hole 107, respectively.

Now, the first wheel block 30 can be rotated about the first block pivot 32 from the handle bar position 95, forward to the roll bar position 96, and simultaneously, the second wheel block 50 can be rotated about the second block pivot 52, forward to the roll bar position.

Finally, the first wheel block 30 and the second wheel block 50 are locked back into the respectively attached first frame block 25 and the second frame block 45. This is preferably achieved by pushing the first block pivot set pin 101 and the second block pivot set pin 105 back into the first raised wheel block pivot hole 103 and the second raised block pivot hole 107, respectively. This action locks the first wheel block and the second wheel block to the respective first frame block and the second frame block to secure the upper bar 90 in the roll bar position 96.

Conversely, conversion of the upper bar 90 from the forward, roll bar position 96, to the rearward, handle bar position 95 includes the steps of unlocking both the first wheel block 30 from the first frame block 25 and the second wheel block 50 from the second frame block 45. This is preferably achieved, as discussed above, by pulling the first block pivot set pin 101 and the block second pivot set pin 105 from the lowered first wheel block pivot hole 104 and the lowered first block pivot hole 108, respectively.

Now, the first wheel block 30 can be rotated about the first block pivot 32 from the roll bar position 96, rearward to the handle bar position 95, and simultaneously, the second wheel block 50 can be rotated about the second block pivot 52, from the roll bar position, rearward to the handle bar position.

Finally, the first wheel block 30 and the second wheel block 50 are locked back into the first frame block 25 and the second frame block 45 with the first wheel block in the lowered first wheel position 81 and the second wheel block in the lowered second wheel position 83. This is preferably achieved by pushing the first block pivot set pin 101 and the second block pivot set pin 102 back into the first lowered wheel block pivot hole 104 and the second lowered block pivot hole 108, respectively. This action locks the first wheel block and the second wheel block to the respective first frame block and the second frame block to secure the upper bar 90 in the handle bar position 95.

In compliance with the statutes, the invention has been described in language more or less specific as to structural features and process steps. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible, which employ the same inventive concepts as described above. Therefore, the invention is not to be limited, except by the following claims, as appropriately interpreted in accordance with the doctrine of equivalents.

What is claimed is:

1. A convertible stroller and trailer comprising:

a first frame block having a first frame mount, the first frame mount attached to a first frame member;

a first wheel block including a first wheel bearing, the first wheel block pivotably interconnected to the first frame block at a first block pivot;

a first wheel having a first hub axle end, the first hub axle end receivable into the first wheel bearing, and the first wheel block rotatable about the first block pivot to selectably raise or lower the first wheel relative to the first block pivot; and a second frame block having a second frame mount, the second frame mount attached to a second frame member;

a second wheel block including a second wheel bearing, the second wheel block pivotably interconnected to the second frame block at a second block pivot;

a second wheel having a second hub axle end, the second axle end receivable into the second wheel bearing, and the second wheel block rotatable about the second block pivot to selectably raise or lower the second wheel relative to the second block pivot.

2. The convertible stroller and trailer of claim 1, wherein the convertible stroller having includes a shaft with a first shaft end and a second shaft end receives the first frame block proximate to the first shaft end and receives the second frame block proximate to the second shaft end, and the first block pivot includes a pivotable connection to the first shaft end and the second block pivot includes a pivotable connection to the second shaft end.

3. The convertible stroller and trailer of claim 1, additionally comprising an upper bar having a first bar end and a second bar end, the first bar end attached to the first wheel block, and the second bar end attached to the second wheel block, the upper bar convertible from a handle bar position to a roll bar position as a function of the pivotable rotation of the first wheel block about the first frame block and as a function of the pivotable rotation of the second wheel block about the second frame block.

4. The convertible stroller and trailer of claim 1, wherein the first frame member and the second frame member are each a jogging stroller frame member.

5. The convertible stroller and trailer of claim 1, additionally comprising a shaft member, the frame shaft including a first shaft end and a second shaft end, and the first block pivot includes a pivotable connection to the first shaft end and the second block pivot includes a pivotable connection to the second shaft end.

6. A convertible stroller and trailer comprising:

an upper bar having a first bar end and a second bar end, the first bar end attached to a first wheel block, and the second bar end attached to a second wheel block, the first wheel block pivotably interconnected to a first frame block at a first block pivot; the first frame block having a first frame mount, the first frame mount attached to a first frame member of the convertible stroller and trailer, the first wheel block rotatable about the first block pivot to selectably move the upper bar to a rearward, handle bar position or a forward, roll bar position; and a second frame block having a second frame mount, the second frame mount attached to a second frame member, the second wheel block pivotably interconnected to a second frame block at a second block pivot, the second wheel block rotatable about the second block pivot to selectably raise or lower the second wheel relative to the second block pivot, and the upper bar convertible from a handle bar position to a roll bar position as a function of the pivotable rotation of the first wheel block about the first frame block and as a function of the pivotable rotation of the second wheel block about the second frame block.

7. The convertible stroller and trailer of claim 6, wherein the first frame member and the second frame member are each a jogging stroller frame member.

8. A method for converting a stroller to a trailer, the method comprising the steps of:

a) providing a jogging type stroller having a pair of rear wheels, the pair of rear wheels including a first wheel and a second rear wheel;

b) unlocking a first wheel block from a lowered first wheel position, the first wheel block rotatably connected to a first frame block, the first frame block mounted to a first frame member of the jogging type stroller, and the first wheel connected to the first wheel block;

c) unlocking a second wheel block from a lowered second wheel position the second wheel block rotatably connected to a second frame block, the second frame block mounted to a second frame member of the jogging type stroller, and the second wheel connected to the second wheel block;

d) simultaneously rotating a first wheel block about a first block pivot to a raised first wheel position and rotating a second wheel block about a second block pivot to a raised second wheel position, to lower the frame in relation to the pair of rear wheels, the first block pivot hingeably connecting the first wheel block to a first frame block, and the second block pivot hingeably connecting the second wheel block to a second frame block;

e) locking the first wheel block in the raised first wheel position; and f) locking the second wheel block in the raised second wheel position.

9. The method for converting a stroller to a trailer, of claim 8 including the additional steps of:

j) providing the jogging type stroller with an upper bar in a rearward, handle bar position, the upper bar including a first bar end and a second bar end, the first bar inserted into the first wheel block, and the second bar end inserted into the second wheel block;

k) unlocking the first wheel block from the first frame block, the first frame block rotatably connected to the first wheel block at the first block pivot, and the first frame block mounted to a first frame member of the jogging type stroller;

l) unlocking the second wheel block from the second wheel block, the second frame block rotatably connected to the second wheel block at a/the second block pivot and the second frame block mounted to a second frame member of the jogging type stroller;

m) simultaneously rotating the first wheel block about the first block pivot to move the upper bar from the handle bar position, forward to a roll bar position and rotating the second wheel block about the second block pivot to move the upper bar, forward to a roll bar position;

n) locking the first wheel block to the first frame block to secure the upper bar in the roll bar position; and o) locking the second wheel block the second frame block to further secure the upper bar in the roll bar position.

10. A method for converting a trailer to a stroller, the method comprising the steps of:

a) providing a trailer having a pair of rear wheels, the pair of rear wheels including a first wheel and a second rear wheel;

b) unlocking a first wheel block from a first wheel raised position, the first wheel block rotatably connected to a first frame block, the first frame block mounted to a first frame member of the jogging type stroller, and the first wheel connected to the first wheel block;

c) unlocking a second wheel block from a locked, second wheel raised position the second wheel block rotatably connected to a second frame block, the second frame block mounted to a second frame member of the jogging type stroller, and the second wheel connected to the second wheel block;

d) simultaneously rotating a first wheel block about a first block pivot to a first wheel lowered position and rotating a second wheel block about a second block pivot to a second wheel lowered position, the first block pivot hingeably connecting the first wheel block to a first frame block, and the second block pivot hingeably connecting the second wheel block to a second frame block;

e) locking the first wheel block to a locked, first wheel lowered position; and f) locking the second wheel block to a locked, second wheel lowered position to raise the frame in relation to the pair of rear wheels.

11. The method for converting a trailer to a stroller, of claim 10 including the additional steps of:

g) providing the trailer with an upper bar in a forward, roll bar position, the bar including a first bar end and a second bar end, the first bar inserted into the first wheel block, and the second bar end inserted into the second wheel block;

h) unlocking the first wheel block from the first frame block;

i) unlocking the second wheel block from the second wheel block;

j) simultaneously rotating the first wheel block about the first block pivot from the roll bar position to move the upper bar rearward, to a handle bar position and rotating the second wheel block about the second block pivot to move the upper bar rearward, to a handle bar position;

k) locking the first wheel block to the first frame block to secure the upper bar in the handle bar position; and l) locking the second wheel block the second frame block to further secure the upper bar in the handle bar position.

12. A method for converting a stroller to a trailer, the method comprising the steps of:

a) providing a jogging type stroller having an upper bar in a rearward, handle bar position, the bar including a first bar end and a second bar end, the first bar inserted into a first wheel block, and the second bar end inserted into a second wheel block;

b) unlocking the first wheel block from a first frame block, the first frame block rotatably connected to the first wheel block at a first block pivot, and the first frame block mounted to a first frame member of the jogging type stroller;

c) unlocking the second wheel block from a second wheel block, the second frame block rotatably connected to the second wheel block at second block pivot, and the second frame block mounted to a second frame member of the jogging type stroller;

d) simultaneously rotating the first wheel block about the first block pivot to move the upper bar from the handle bar position forward, to a roll bar position and rotating the second wheel block about the second block pivot to move the upper bar forward, to a roll bar position;

e) locking the first wheel block to the first frame block to secure the upper bar in the roll bar position; and f) locking the second wheel block the second frame block to further secure the upper bar in the roll bar position.

* * * * *